US012762760B1

(12) United States Patent
Grinshpoun et al.

(10) Patent No.: US 12,762,760 B1
(45) Date of Patent: Oct. 13, 2026

(54) MULTI-AGENT PHOTOGRAPH GENERATION

(71) Applicant: UVeye Ltd., Tel Aviv (IL)

(72) Inventors: Ilya Grinshpoun, Ramat Gan (IL); Yuval Levi, Rishon LeZion (IL); Itai Orr, Or Akiva (IL); Amir Hever, Tenafly, NJ (US)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 19/634,279

(22) Filed: Mar. 31, 2026

(51) Int. Cl.
*G06T 11/00* (2026.01)

(52) U.S. Cl.
CPC .................................... *G06T 11/00* (2013.01)

(58) Field of Classification Search
CPC ....................................................... G06T 11/00
See application file for complete search history.

(56) References Cited

U.S. PATENT DOCUMENTS

2021/0342997 A1* 11/2021 Malreddy ............. G06F 18/214
2025/0022274 A1* 1/2025 Malalur ................. G06V 10/82
2026/0063563 A1* 3/2026 Brighton ............... G06T 7/0004

OTHER PUBLICATIONS

Akdemir et al. "Audit & Repair: An Agentic Framework for Consistent Story Visualization in Text-to-Image Diffusion Models", https://arxiv.org/pdf/2506.18900, 1-21 pages, Jun. 23, 2025.
Jeon et al. "Iterative Prompt Refinement for Safer Text-to-Image Generation", Korea University, https://arxiv.org/pdf/2509.13760, 1-17 pages, Sep. 17, 2025.
Liang et al. "An LLM-LVLM Driven Agent for Iterative and Fine-Grained Image Editing", https://arxiv.org/pdf/2508.17435, 1-11 pages, Kunming University of Science and Technology, Aug. 24, 2025.
Wang et al. "From Image Generation to Infrastructure Design: a Multi-agent Pipeline for Street Design Generation", 1-21, https://arxiv.org/pdf/2509.05469, Sep. 5, 2025.
Wu et al. "Self-correcting LLM-controlled Diffusion Models", UC Berkeley, https://arxiv.org/pdf/2311.16090, 1-16, Nov. 27, 2023.
Yc ct al. "GenPilot: A Multi-Agent System for Test-Time Prompt Optimization in Image Generation", https://arxiv.org/pdf/2510.07217, 1-30, Oct. 8, 2025.

* cited by examiner

*Primary Examiner* — King Y Poon
*Assistant Examiner* — Patrick P Galera

(57) ABSTRACT

There is provided a method, comprising: feeding an input image of a vehicle into an inspection AI-agent for generating reference data including vehicle parts and visual features, feeding the input image and the reference data into a generation AI-agent for generating a standardized image rendering the vehicle according to standardized parameters, in iterations: feeding the standardized image into the inspection AI-agent for evaluating the standardized image in view of the input image for detecting visual inconsistencies, adapting the reference data for correcting the visual inconsistencies, feeding the adapted reference data into the generation AI-agent to obtain an adaptation of the standardized image, wherein the adaptation of the standardized image is fed into the inspection AI-agent in a subsequent iteration, wherein the iterations are terminated when the detected inconsistencies meet a requirement denoting visually insignificant differences that preserve visual identity of the specific physical vehicle included in the unconstrained input image.

20 Claims, 3 Drawing Sheets

MULTI-AGENT PHOTOGRAPH GENERATION

BACKGROUND

The present invention, in some embodiments thereof, relates to artificial intelligence (AI)-agents and, more specifically, but not exclusively, to AI-agents for photograph generation.

AI-agents for generating photographs use deep learning models, like GANs or diffusion models, to create realistic images from text prompts or reference images. They can produce high-resolution, stylistically diverse visuals, often indistinguishable from real photos. These agents enable rapid content creation for art, marketing, and design. They can also modify existing images, applying edits or transformations based on user instructions.

SUMMARY

According to a first aspect, a computer implemented method of generating at least one standardized vehicle image, comprises: feeding at least one unconstrained input image including a specific physical vehicle into an inspection AI-agent, generating, by the inspection AI-agent, a set of generation reference data, wherein the set of generation reference data includes a plurality of vehicle parts and, for each vehicle part, at least one visual feature, feeding the at least one unconstrained input image and the set of generation reference data into a generation AI-agent for generating at least one candidate standardized image, wherein the at least one candidate standardized image renders the specific physical vehicle according to at least one standardized parameter, performing, in a plurality of iterations: feeding the at least one candidate standardized image into the inspection AI-agent, evaluating, by the inspection AI-agent, the at least one candidate standardized image in view of the at least one unconstrained input image for detecting visual inconsistencies, adapting the set of generation reference data for correcting the detected visual inconsistencies, feeding the adapted set of generation reference data into the generation AI-agent to obtain an adaptation of the at least one candidate standardized image, wherein the adaptation of the at least one candidate standardized image is fed into the inspection AI-agent in a subsequent iteration, wherein the plurality of iterations are terminated when the detected inconsistencies meet a requirement denoting visually insignificant differences that preserve visual identity of the specific physical vehicle included in the at least one unconstrained input image, and providing the adaptation of the at least one candidate standardized image of the terminated iteration as at least one target standardized image.

According to a second aspect, a system for generating at least one standardized vehicle image, comprising: at least one processor executing a code for: feeding at least one unconstrained input image including a specific physical vehicle into an inspection AI-agent, generating, by the inspection AI-agent, a set of generation reference data, wherein the set of generation reference data includes a plurality of vehicle parts and, for each vehicle part, at least one visual feature, feeding the at least one unconstrained input image and the set of generation reference data into a generation AI-agent for generating at least one candidate standardized image, wherein the at least one candidate standardized image renders the specific physical vehicle according to at least one standardized parameter, performing, in a plurality of iterations: feeding the at least one candidate standardized image into the inspection AI-agent, evaluating, by the inspection AI-agent, the at least one candidate standardized image in view of the at least one unconstrained input image for detecting visual inconsistencies, adapting the set of generation reference data for correcting the detected visual inconsistencies, feeding the adapted set of generation reference data into the generation AI-agent to obtain an adaptation of the at least one candidate standardized image, wherein the adaptation of the at least one candidate standardized image is fed into the inspection AI-agent in a subsequent iteration, wherein the plurality of iterations are terminated when the detected inconsistencies meet a requirement denoting visually insignificant differences that preserve visual identity of the specific physical vehicle included in the at least one unconstrained input image, and providing the adaptation of the at least one candidate standardized image of the terminated iteration as at least one target standardized image.

According to a third aspect, a non-transitory medium storing program instructions for generating at least one standardized vehicle image, which when executed by at least one processor of a first proxy device, cause the at least one processor to: feed at least one unconstrained input image and the set of generation reference data into a generation AI-agent for generating at least one candidate standardized image, wherein the at least one candidate standardized image renders the specific physical vehicle according to at least one standardized parameter, performing, in a plurality of iterations: feeding the at least one candidate standardized image into an inspection AI-agent, evaluate, by the inspection AI-agent, the at least one candidate standardized image in view of the at least one unconstrained input image for detecting visual inconsistencies, adapt the set of generation reference data for correcting the detected visual inconsistencies, feed the adapted set of generation reference data into the generation AI-agent to obtain an adaptation of the at least one candidate standardized image, wherein the adaptation of the at least one candidate standardized image is fed into the inspection AI-agent in a subsequent iteration, wherein the plurality of iterations are terminated when the detected inconsistencies meet a requirement denoting visually insignificant differences that preserve visual identity of the specific physical vehicle included in the at least one unconstrained input image, and provide the adaptation of the at least one candidate standardized image of the terminated iteration as at least one target standardized image.

In a further implementation form of the first, second, and third aspects, further comprising computing a corresponding part-wise similarity score for each vehicle part of the plurality of vehicle parts, the corresponding part-wise similarity score computed between a respective vehicle part of the at least one candidate standardized image and the corresponding vehicle part of the at least one unconstrained input image, wherein the plurality of iterations are terminated in response to determining that each part-wise similarity score is above a threshold indicating visually insignificant differences.

In a further implementation form of the first, second, and third aspects, the at least one unconstrained input image varies in at least one of: pose, lighting, exposure, background, camera, optics, framing, resolution, and image quality.

In a further implementation form of the first, second, and third aspects, a plurality of candidate standardized images are generated for a plurality of unconstrained input images for a plurality of different vehicles, wherein each of the plurality of candidate standardized images depicting the plurality of different vehicles is generated to depict at least one standardized parameter selected from: a predefined pose, predefined illumination, predefined resolution, predefined image quality, and predefined background.

In a further implementation form of the first, second, and third aspects, each vehicle part is represented in the set of generation reference data by at least one of: a text prompt description, an image embedding, a Canny edge map, a depth map, a semantic segmentation map, a reference crop, and a mask.

In a further implementation form of the first, second, and third aspects, the at least one feature for each vehicle part is selected from: detected damage, trim, stickers, color, corresponding physical size, specific design style.

In a further implementation form of the first, second, and third aspects, detecting visual inconsistencies comprises at least one of: detecting at least one mismatched vehicle part, and detecting at least one mismatched visual feature between specific corresponding vehicle parts.

In a further implementation form of the first, second, and third aspects, the at least one unconstrained input image comprises a photograph of the specific physical vehicle captured by a camera, and the at least one candidate standardized image comprises a synthesized photorealistic image of the specific physical vehicle.

In a further implementation form of the first, second, and third aspects, the generation AI-agent applies multi-modal conditioning, including at least two of: text, image, and mask, for generating the at least one candidate standardized image complying with the set of generation reference data.

In a further implementation form of the first, second, and third aspects, the at least one unconstrained input image is fed into the inspection AI-agent in combination with vehicle metadata.

In a further implementation form of the first, second, and third aspects, the generation AI-agent is implemented as a latent diffusion model for generation of the at least one candidate standardized image according to the set of generation reference data.

In a further implementation form of the first, second, and third aspects, the inspection AI-agent is implemented as at least one of: Vision-Language Models (VLMs), Large Language Models (LLMs), and Deep Neural Networks (DNNs).

In a further implementation form of the first, second, and third aspects, the inspection AI-agent is configured for generating the set of generation reference data by at least one of: semantic segmentation of the plurality of vehicle parts, classification of the plurality of vehicle parts, and detection of the at least one feature for specific vehicle parts.

In a further implementation form of the first, second, and third aspects, the plurality of vehicle parts are selected from: wheels, rims, grille, lights, mirrors, windows, roof, and badges.

In a further implementation form of the first, second, and third aspects, visual inconsistencies between the specific vehicle in the at least one unconstrained input image and the at least one candidate standardized image detected by the inspection AI-agent are selected from: a scratch pattern, dent geometry, sticker placement, aftermarket modification, and damage marking, and associated with a specific vehicle part and/or associated with a location within the specific vehicle part.

In a further implementation form of the first, second, and third aspects, the adapted set of generation reference data comprises instructions for localized repair of a target vehicle part including a repair mask, wherein the generation AI-agent generates the at least one adapted candidate standardized image by performing an image editing process constrained to the repair mask according to the instructions for localized repair of the target vehicle part.

In a further implementation form of the first, second, and third aspects, the image editing process constrained to the repair mask further comprises constraining pixels outside the repair mask to remain unchanged relative to the candidate standardized image being edited by applying at least one of: a pixel-domain reconstruction loss outside the repair mask, a latent-space preservation loss outside the repair mask, and a guidance weight configured to suppress modifications outside the repair mask.

In a further implementation form of the first, second, and third aspects, further comprising: creating a part-indexed reference library from the at least one unconstrained input image of the specific physical vehicle, the part-indexed reference library comprising, for each of the plurality of vehicle parts, the at least one visual feature, at least one reference crop, and at least one embedding of the vehicle part, computing part-wise similarity scores between generated part regions in the at least one candidate standardized image and corresponding entries in the part-indexed reference library, identifying at least one erroneous vehicle part having a part-wise similarity score below a threshold indicating visual inconsistency, and adapting the set of generation reference data for correcting the at least one erroneous vehicle part.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
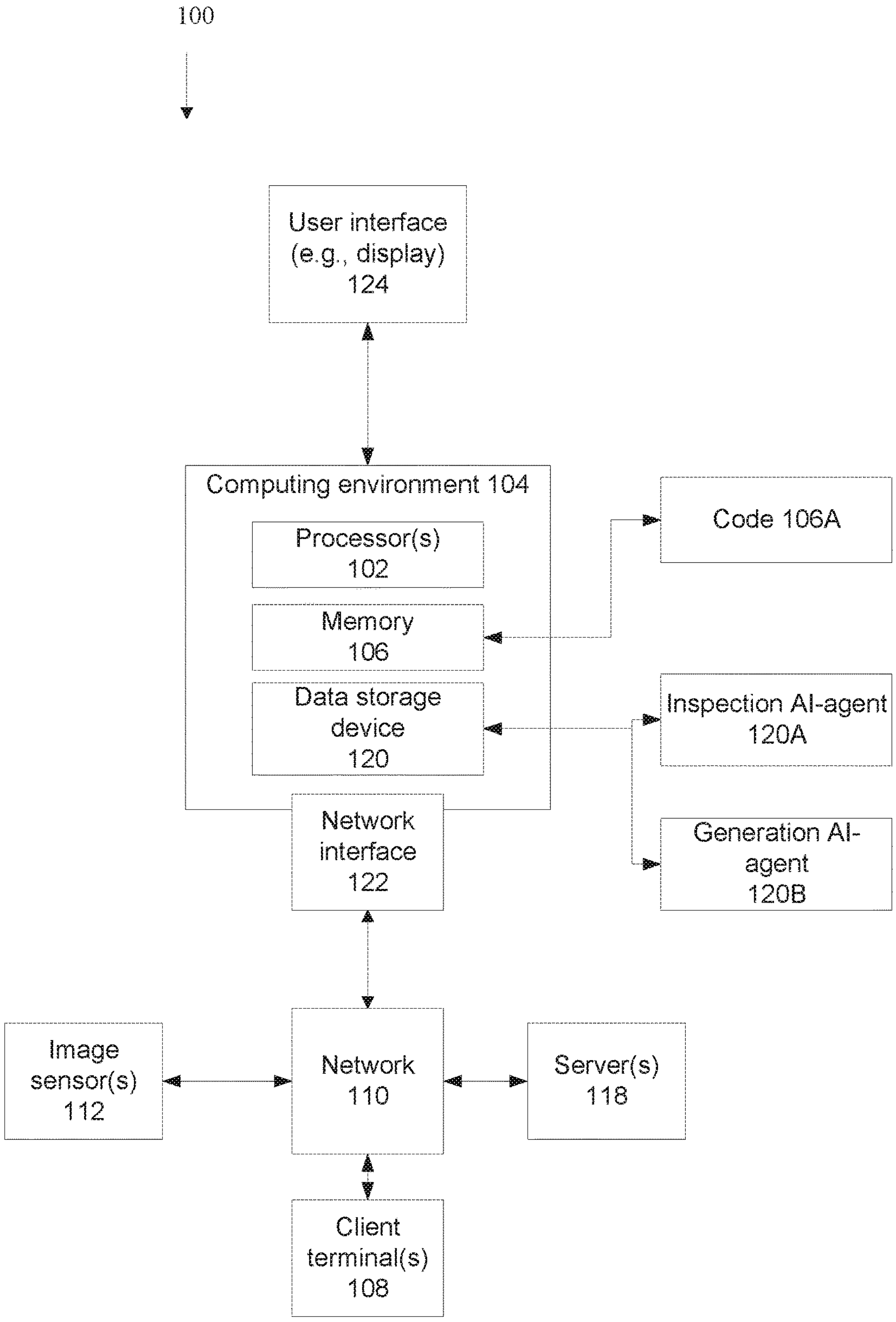
FIG. 1 is a block diagram of components of a system for generating a standardized vehicle image(s) from an unconstrained input image depicting a specific physical vehicle, in accordance with some embodiments of the present invention.

The present invention, in some embodiments thereof, relates to artificial intelligence (AI)-agents and, more specifically, but not exclusively, to AI-agents for photograph generation.

An aspect of some embodiments of the present invention relates to systems, methods, computing devices, and/or code instructions (stored on a data storage device and executable by one or more processors) for generating at least one standardized vehicle image of a vehicle from at least one unconstrained input image of the vehicle. At least one unconstrained input image depicting a specific physical vehicle is fed into an inspection AI-agent. The unconstrained input image may be captured by a camera at an arbitrary parameter(s), for example, pose, amount of lighting, resolution, focus, and the like. The inspection AI-agent generates a set of generation reference data that includes multiple vehicle parts. At least one visual feature may be included for each vehicle part, for example, presence of damage to the vehicle part (e.g., dent, scratch), size, color, trim, design pattern, and the like. The unconstrained input image(s) and the set of generation reference data are fed into a generation AI-agent. The generation AI-agent generates at least one candidate standardized image that renders the specific physical vehicle according to one or more standardized parameters (e.g., pose, lighting, quality, resolution). The following features are performed in multiple iterations: The candidate standardized image(s) (which was generated by the generation AI-agent) is fed into the inspection AI-agent. The inspection AI-agent evaluates the candidate standardized image(s) in view of the unconstrained input image(s) for detecting visual inconsistencies. The set of generation reference data is adapted for correcting the detected inconsistencies. The adapted set of generation reference data is fed into the generation AI-agent to obtain an adaptation of the candidate standardized image(s). The adaptation of the candidate standardized image(s) is fed into the inspection AI-agent in a subsequent iteration. The iterations are terminated when the detected inconsistencies meet a requirement denoting visually insignificant differences that preserve visual identity of the specific physical vehicle included in the unconstrained input image(s). The adaptation of the candidate standardized image of the most recent (i.e., terminated) iteration is provided as a target standardized image (s).

At least one embodiment described herein addresses the technical problem of generating standardized photorealistic images of objects (e.g., vehicles) by AI-agents that are visually indistinguishable from the actual physical objects (e.g., vehicles), as depicted in unconstrained input images captured by a camera. The technical problem may relate to achieving reliable, repeatable photorealistic outputs from real-world source imagery that varies widely in capture conditions, while maintaining strict consistency of fine-grained visual attributes that are present in the source imagery. At least one embodiment described herein improves the technology of image synthesis, by enabling AI-agents to generate photorealistic images of objects (e.g., vehicles) that are visually indistinguishable from the actual physical objects (e.g., vehicles), as depicted in unconstrained input images captured by a camera. At least one embodiment described herein improves upon existing approaches for generating photorealistic images of objects (e.g., vehicles) by AI-agents. At least one embodiment described herein provides the practical application of generating a standardized image of an object (e.g., vehicle) by an AI-agent, of an unconstrained input image captured by a camera, where the standardized image preserves visual identity of the object (e.g., vehicle).

Input photographs may differ, for example, in viewpoint, illumination, exposure, background clutter, resolution, camera type, lens type, and/or occlusions, and may provide incomplete and/or non-uniform coverage of the object. Using generative models to render the object may result in images with uncontrolled variation, hallucinated details, and/or drift across iterations and/or across multiple output views, particularly for small but salient features, textures, and/or localized identifiers. For example, a user captures one or more images of a vehicle (e.g., car) with their camera (e.g., integrated within a smartphone), and sends the image (s) to a used car dealer. The used car dealer wishes to standardize the images of different vehicles received from different users, which vary, such as in pose, quality, and the like. For example, the used car dealer would like all the images of vehicles they are selling to be shown from the same pose using the same lighting effects. Using standard approaches, such as feeding the image into a GAN along with instructions on how to standardize the vehicle in the image, may result in mismatches between the vehicles in the generated standardized images and the actual vehicles. For example, damage to the vehicle (e.g., scratches) may be omitted in the generated standardized images, which may be misleading and therefore problematic. In another example, specific rim designs of the wheels may be different, which may be misleading. In yet another example, an upgraded feature, such as a sunroof, which is actually present in the real vehicle may be absent from the vehicle in the generated standardized image, preventing a selling point from being shown.

At least one embodiment is designed to generate standardized image(s) that maintain visual identity of the vehicle, regardless of the image capture parameters, such as quality and/or angle of the unconstrained input image.

Effectively, the generation AI-agent may be designed to accept an input of the unconstrained image of the vehicle, which may be captured with different parameters (e.g., pose, lighting, exposure, background, camera, optics, framing, resolution, and/or image quality), and synthesize a standardized image of the vehicle at predefined standardized parameters while preserving visual features of the vehicle. Without the implementation of at least one embodiment, visual features of the physical vehicle may become distorted during the image generation process (e.g., hallucinations), for example, visual features may be missing (e.g., a dent in the bumper of the physical vehicle is not shown in the synthesized image), visual features may be distorted (e.g., the pattern of the wheel hubs of the physical vehicle is different in the synthesized image), and/or new visual features may be added (e.g., no stripe across the passenger door is present in the physical vehicle, but such stripe is depicted in the synthesized image).

At least one embodiment solves the aforementioned technical problem, and/or improves upon the aforementioned technical field, and/or improves upon the aforementioned prior approaches, and/or provides the practical application of generating at least one standardized vehicle image from at least one unconstrained input image of the vehicle, by feeding at least one unconstrained input image depicting a specific physical vehicle into an inspection AI-agent. The unconstrained input image may be captured by a camera at an arbitrary parameter(s), for example, pose, amount of lighting, resolution, focus, and the like. The inspection AI-agent generates a set of generation reference data that includes multiple vehicle parts. At least one visual feature may be included for each vehicle part, for example, presence of damage to the vehicle part (e.g., dent, scratch), size, color, trim, design pattern, and the like. The unconstrained input image(s) and the set of generation reference data are fed into a generation AI-agent. The generation AI-agent generates at least one candidate standardized image that renders the specific physical vehicle according to one or more standardized parameters (e.g., pose, lighting, quality, resolution). The following features are performed in multiple iterations: The candidate standardized image(s) (which was generated by the generation AI-agent) is fed into the inspection AI-agent. The inspection AI-agent evaluates the candidate standardized image(s) in view of the unconstrained input image(s) for detecting visual inconsistencies. The set of generation reference data is adapted for correcting the detected inconsistencies. The adapted set of generation reference data is fed into the generation AI-agent to obtain an adaptation of the candidate standardized image(s). The adaptation of the candidate standardized image(s) is fed into the inspection AI-agent in a subsequent iteration. The iterations are terminated when the detected inconsistencies meet a requirement denoting visually insignificant differences that preserve visual identity of the specific physical vehicle included in the unconstrained input image(s). The adaptation of the candidate standardized image of the most recent (i.e., terminated) iteration is provided as a target standardized image (s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
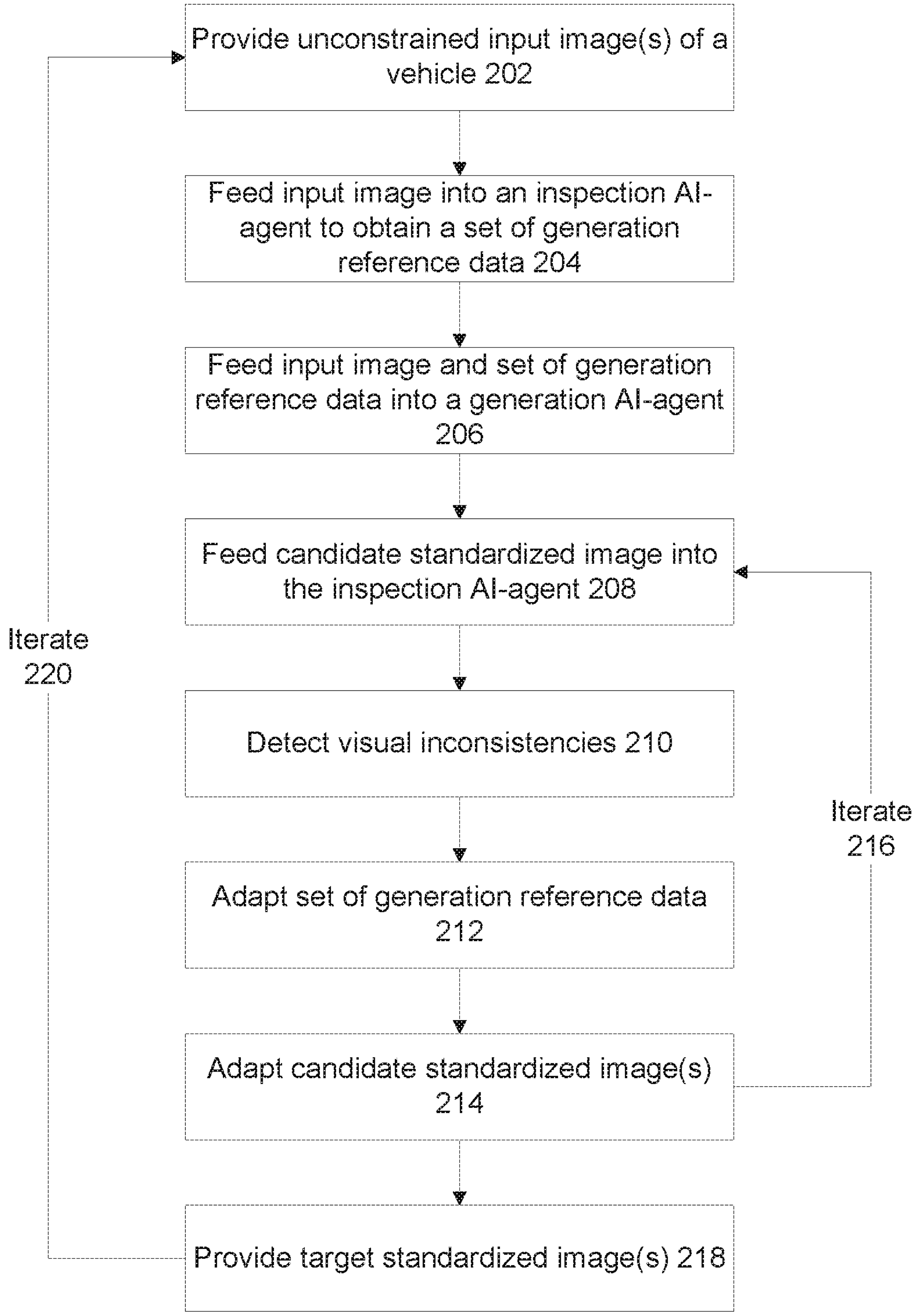
FIG. 2 is a flowchart of a method of generating a standardized vehicle image(s) from an unconstrained input image depicting a specific physical vehicle, in accordance with some embodiments of the present invention.
Figure 3:
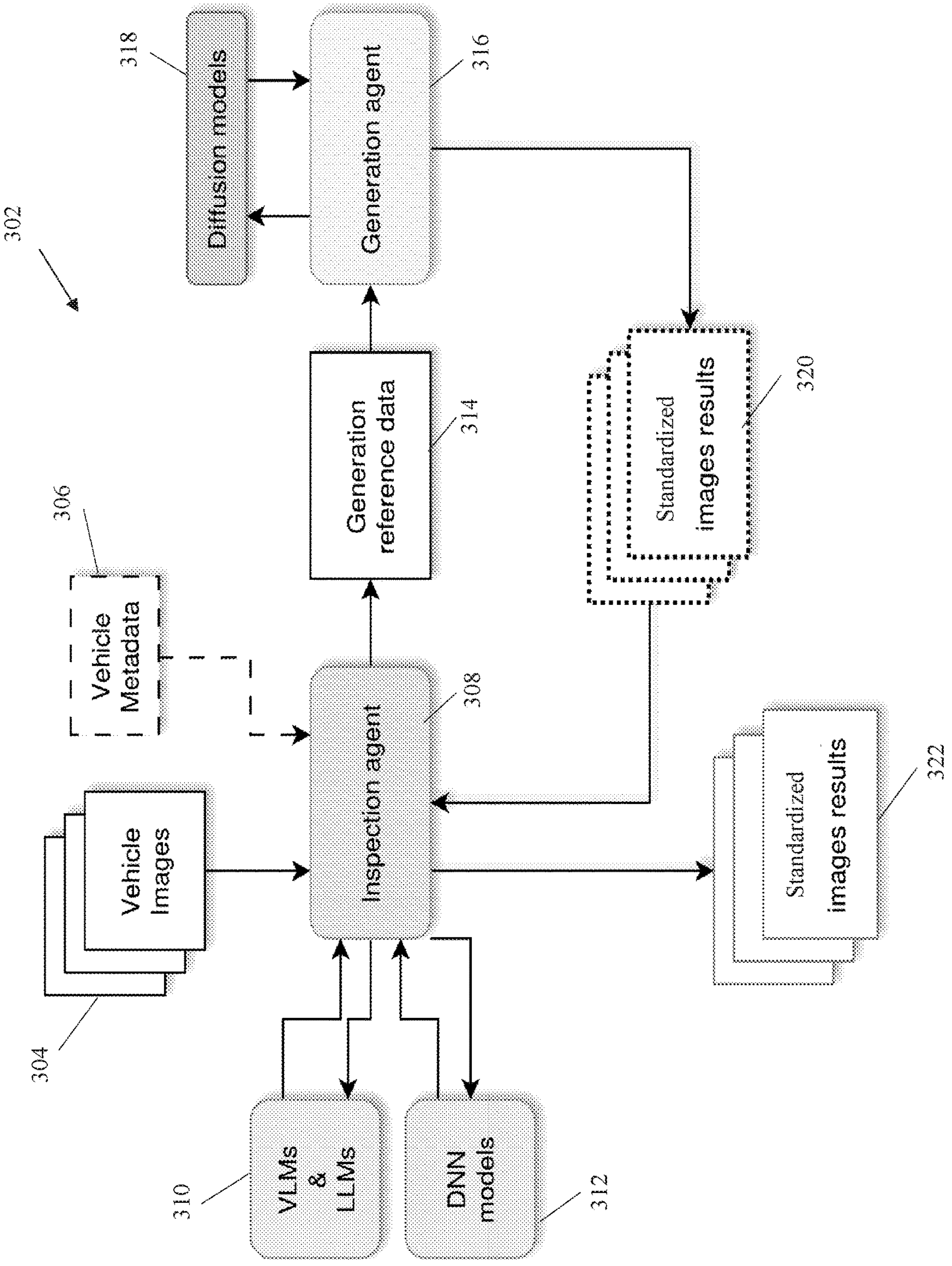
FIG. 3 is a dataflow diagram depicting exemplary dataflow for generating a standardized vehicle image(s) from an unconstrained input image depicting a specific physical vehicle, in accordance with some embodiments of the present invention.

Reference is now made to FIG. 1, which is a block diagram of components of a system 100 for generating a standardized vehicle image(s) from an unconstrained input image depicting a specific physical vehicle, in accordance with some embodiments of the present invention. Reference is also made to FIG. 2, which is a flowchart of a method of generating a standardized vehicle image(s) from an unconstrained input image depicting a specific physical vehicle, in accordance with some embodiments of the present invention. Reference is also made to FIG. 3, which is a dataflow diagram 302 depicting exemplary dataflow for generating a standardized vehicle image(s) from an unconstrained input image depicting a specific physical vehicle, in accordance with some embodiments of the present invention.

Referring now back to FIG. 1, system 100 may implement the features of the method(s) described herein, for example with reference to FIG. 2 and/or FIG. 3, by one or more hardware processors 102 of a computing environment 104 executing code instructions stored in a memory (also referred to as a program store) 106.

Computing environment 104 may be implemented as, for example one or more and/or combination of: a computing cloud, a group of connected devices, a client terminal, a server, a virtual server, a virtual machine, a desktop computer, a thin client, a network node, and/or a mobile device (e.g., a smartphone, a tablet computer, a laptop computer, a wearable computer, glasses computer, and a watch computer).

Multiple architectures of system 100 based on computing environment 104 may be implemented.

In an exemplary centralized implementation, computing environment 104 storing code 106A may be implemented as one or more servers (e.g., network server, web server, a computing cloud, a virtual server) that provides services (e.g., one or more of the acts described with reference to FIG. 2 and/or other methods described herein) to one or more servers 118 and/or client terminals 108 over a network 110, for example, providing software as a service (SaaS) to the servers 118 and/or client terminal(s) 108, providing software services accessible using a software interface (e.g., application programming interface (API), software development kit (SDK)), providing an application for local download to the servers 118 and/or client terminal(s) 108, and/or providing functions using a remote access session to the servers 118 and/or client terminal(s) 108, such as through a web browser and/or viewing application. For example, different client terminals 108 may send locally captured unconstrained images of different vehicles captured by multiple different image sensors 112 (e.g., cameras) positioned at different poses and/or with other variability, to computing environment 104. Computing environment 104 generates standardized images with uniform parameters, by iteratively operating an inspection AI-agent 120A and generation AI-agent 120B, as described herein. Computing environment 104 may perform other image processing and/or analysis as described herein. The generated standardized images may be provided by computing environment 104 to respective client terminals 108 and/or server(s) 118 and/or locally stored, for example, for presentation on a display, storage in a data storage device, fed into another process, and the like.

In an exemplary localized implementation, code 106A is locally executed by computing environment 104. For example, computing environment 104 is installed in a local used vehicle dealership and connected to locally installed image sensors 112. Images captured by the different image sensors 112 optionally under different parameters (e.g., pose, illumination, etc. . . . ) are used to locally generate standardized images as described herein. The generated standardized images may, for example, be presented on a display associated with computing environment 104, be locally stored, forwarded to a remote device, fed into an executing process, and the like.

Image sensor(s) 112 may be implemented as, for example, a camera, a CMOS or CCD sensor, a rolling-shutter or global-shutter sensor, a Bayer or non-Bayer color filter array sensor, an HDR-capable sensor, a monochrome sensor, and/or a depth-sensing modality such as time-of-flight, structured light, or stereo imaging.

Image sensor(s) 112 may be built into a mobile device.

Image sensor(s) 112 may transmit captured images to computing environment 104, for example, via a direct connected (e.g., local bus and/or cable connection and/or short range wireless connection), and/or via a network 110 and a network interface 122 of computing environment 104 (e.g., where sensors are connected via a wireless network, internet of things (IoT) technology and/or are located remotely from the computing device). Image sensor(s) 112 may indirectly transmit captured images to computing environment 104 via client terminal(s) 108 and/or server(s) 118. For example, images captured by image sensor(s) 112 are locally stored on client terminal(s) 108 and/or server(s) 118, and sent to computing environment 104 via network 110.

Network interface 122 may be implemented as, for example, a wired connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 106 stores code instructions executable by hardware processor(s) 102. Exemplary memories 106 include a random access memory (RAM), read-only memory (ROM), a storage device, non-volatile memory, magnetic media, semiconductor memory devices, hard drive, removable storage, and optical media (e.g., DVD, CD-ROM). For example, memory 106 may store code 106A that execute one or more acts of the method described with reference to FIG. 2 and/or other methods described herein.

Computing environment 104 may include data storage device 120 for storing data, for example, inspection AI-agent (s) 120A, generation AI-agent(s) 120B, and/or other data described herein. Data storage device 120 may be implemented as, for example, a memory, a local hard-drive, a removable storage unit, an optical disk, a storage device, a virtual memory and/or as a remote server 118 and/or computing cloud (e.g., accessed over network 110).

Exemplary architectures of the AI-agent(s) 120A and/or generation AI-agent(s) 120B, include for example, one or more or a combination of: a detector architecture, a classifier architecture, and/or a pipeline combination of detector(s) and/or classifier(s), for example, statistical classifiers and/or other statistical models, neural networks of various architectures (e.g., convolutional, fully connected, deep, encoder-decoder, recurrent, transformer, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning. Machine learning models may be trained using supervised approaches and/or unsupervised approaches.

Computing environment 104 and/or client terminal(s) 108 include and/or are in communication with one or more physical user interfaces 124 that include a mechanism for inputting data and/or for viewing data, for example, a display for presenting data such as the generated standardized images and/or for entering data such as entering metadata of the vehicle. Exemplary user interfaces 124 include, for example, one or more of, a touchscreen, a display, a keyboard, a mouse, and voice activated software using speakers and microphone.

Referring now back to FIG. 2, at 202, at least one unconstrained input image depicting a specific physical vehicle (also referred to herein as input image) is provided, for example, accessed and/or received.

Examples of vehicles include: road based vehicle, for example, a car, a sports car, a sport utility vehicle (SUV), a truck, a van, a minivan, a minibus, and a bus. The vehicle may be an autonomously driven vehicle, a manually driven vehicle, or a semi-autonomous semi-manual driven vehicle. Other examples of vehicles include: a boat, and a plane (e.g., light plane).

The input image may be captured by a camera, for example, a red, green, blue (RGB) camera, a digital single lens reflex (DSLR) camera, and the like.

The camera may be, for example, integrated within a smartphone, or a standalone device.

The unconstrained input image may be captured with arbitrary values of one or more parameters associated with capture of the input image, for example, pose, lighting, exposure, background, camera, optics, framing, resolution, and/or image quality. Different unconstrained input images may be captured with variability in the aforementioned parameters. The system is designed to receive unconstrained input images for which values of the aforementioned parameters are not known in advance and/or are not constrained to any particular values (or ranges).

The unconstrained input image may be implemented as a photograph of the specific physical vehicle captured by the camera. The (candidate) standardized image generated based on the unconstrained input image may be implemented as a synthesized photorealistic image of the specific physical vehicle.

Optionally, a part-indexed reference library is generated from the unconstrained input image(s) of the specific physical vehicle. The part-indexed reference library may include multiple records. A respective record may include, for example:

- An indication of a vehicle part. Each record may be created for a respective vehicle part. The vehicle parts may be detected, for example, by segmenting the input image using a trained segmentation model (or component of one or more of the AI-agents described herein). The trained segmentation model may be implemented based on a neural network architecture, and trained on a training dataset of sample images of different vehicles each labelled with a ground truth label indicating segmentation and/or labels of the different vehicle parts. Examples of vehicle parts include: wheels, rims, grille, lights, mirrors, windows, roof, and badges.
- One or more visual features detected for the respective vehicle part. The visual features may be detected, for example, by a detector model (or component of one or more of the AI-agents described herein). The trained detector model may be implemented based on a neural network architecture, and trained on a training dataset of sample images of different vehicles each labelled with a ground truth label indicating detected visual features and/or labels of the different visual features. Examples of visual features of each vehicle part include: damage (e.g., dent, scratch), trim, stickers, color, corresponding physical size, and/or specific design style.
- One or more reference crops of the vehicle part. The reference crop may be generated, for example, by extracting the segmented vehicle part from the input image. The reference crop may be extracted according to a segmented boundary. Extracting along the segmented boundary may be used to generate a repair mask, as described herein.
- One or more embedding of the vehicle part. The embeddings may be generated from the reference crop. The embedding may be generated by feeding the reference crop of the vehicle part into an encoder network (e.g., a neural network where the embedding is extracted from a hidden layer). The embedding may be used to compute part-wise and/or feature-wise similarity scores, as described herein.

At 204, the unconstrained input image(s) depicting the specific physical vehicle is fed into an inspection AI-agent for generating a set of generation reference data.

Optionally, the unconstrained input image(s) is fed into the inspection AI-agent in combination with vehicle metadata. Exemplary vehicle metadata include: vehicle manufacturer, vehicle model, vehicle year, trim of the vehicle model, and color. The vehicle metadata may be provided, for example, extracted from a vehicle database (e.g., government registration of vehicles), obtained from storage (e.g., previously provided), manually entered by a user via a user interface, and the like.

The inspection AI-agent is designed and/or trained for generating a set of generation reference data.

The set of generation reference data may be designed to serve as instructions for generation of the standardized image that preserves visual features (also referred to herein as features) of the physical vehicle depicted in the unconstrained input image. For example, a scratch on a passenger door of the vehicle in unconstrained input image, which is to appear on the vehicle depicted in the standardized image. In another example, a specific design pattern of wheel hubs of the vehicle in unconstrained input image, which appear on the wheels of the vehicle depicted in the standardized image.

The set of generation reference data may include textual descriptions (e.g., prompts) and/or visual conditioning cues (e.g., reference crops, masks, and/or vehicle part maps).

In an initial iteration, the inspection AI-agent may generate the generation reference data optimized to guide the generation AI-agent as described herein.

The set of generation reference data may include an indication of parts of the vehicle, and/or at least one visual feature for each vehicle part. Vehicle parts may be defined, for example, as distinct components that may be individually replaceable, and/or that have distinct borders. The detected features may represent visual features which are to be depicted in the generated standardized images.

The set of generation reference data may be implemented as a comprehensive dataset used to condition the generative model.

The set of generation reference data may include one or more of: text prompts, image embeddings, Canny edge maps, depth maps, semantic segmentation maps (car part maps), and specific feature crops. This data serves as the constraining parameters for the generation AI-agent.

Optionally, each vehicle part is represented in the set of generation reference data by at least one of: a text prompt description, an image embedding, a Canny edge map, a depth map, a semantic segmentation map, a reference crop, and a mask.

The set of generation reference data may include a segmentation of vehicle parts of the vehicle. The set of generation reference data may be generated by the inspection AI-agent by semantic segmentation of vehicle parts of the specific vehicle depicted in the input image. For example, a semantic segmentation implementation of the inspection AI-agent assigns a respective category indicating a respective vehicle part to individual pixels of the input image. In another example, a segmentation implementation of the inspection AI-agent segments each identified vehicle part. The inspection AI-agent may be implemented as, and/or may include, a trained segmentation model trained to perform the semantic segmentation. The semantic segmentation model may be trained on a training dataset of sample images of different vehicles captured at different parameters, labelled with a ground truth label indicating segmentation of the different vehicle parts. The label may be per pixel and/or for the vehicle part.

Alternatively or additionally, the set of generation reference data may include an indication of one or more detected features. Features may be detected for specific vehicle parts. For example, one or more bounding boxes delineating specific detected features may be generated. The inspection AI-agent may be implemented as, and/or may include, a trained detector model trained to perform the detection. The detector model may be trained on a training dataset of sample images of different vehicles captured at different parameters, labelled with a ground truth label indicating specific features, for example, by bounding boxes.

Alternatively or additionally, the set of generation reference data may include one or more classification categories for each vehicle part. The classification categories may be integrated with the segmentation and/or detection, such as by providing the vehicle part for each segmentation, and/or by providing the classification category for each detected feature.

Alternatively or additionally, the set of generation reference data may include visual cues extracted from real images captured by the system. For example, the system may capture a burst and/or short video sequence of the vehicle and may select a subset of frames (e.g., based on sharpness, coverage of parts, and reduced occlusion). The inspection AI-agent may generate part-specific visual cues from such frames, such as reference crops of rims, grille, badges, and localized damage regions. The visual cues may include, for example, mask, edge maps, depth maps, and the like.

Alternatively or additionally, the set of generation reference data may include a verbal description of the vehicle generated according to an analysis of the captured frames, such as a natural language description of parameters and/or features of the parts of the vehicle. The verbal description may be included in the set of generation reference data. The verbal description may implemented as a natural-language description that enumerates identity-critical attributes and their locations, such as "blue sedan; five-spoke rims; scratch on passenger-side front door near handle; dent on left rear bumper; no sunroof; chrome trim present."

The inspection AI-agent may be implemented, for example, one or combination of: Vision-Language Models (VLMs), Large Language Models (LLMs), and Deep Neural Networks (DNNs). The inspection AI-agent may include segmentation and/or detector and/or classification components.

In some embodiments, the set of generation reference data is implemented in any one or more or combination of a variety of machine-readable structures suitable to condition, constrain, and/or guide the generation AI-agent, including combinations of textual, visual, geometric, and parametric representations. The set of generation reference data may be implemented as, for example: (i) a structured record (e.g., JSON, XML, protobuf) comprising per-part fields (part ID, part mask/coordinates, detected attributes, and confidence scores) and global fields defining standardized parameters (target pose, target illumination, background style, resolution); (ii) a multi-channel conditioning tensor aligned to the output image resolution that stacks semantic part labels, instance IDs, edge maps, and damage masks as separate channels; (iii) one or more pixel-accurate masks (binary and/or soft masks) for inpainting/edit constraints, including a "do-not-change" mask outside target repair regions and a "must-match" mask over critical identity regions (e.g., rims, badges, damage); (iv) one or more reference crops per vehicle part (e.g., wheel crop, grille crop, door crop) optionally accompanied by canonicalization transforms (e.g., rotation/scale normalization, polar unwrap for rims) that are fed as image prompts to an image-to-image diffusion model or ControlNet-style adapter; (v) one or more learned embeddings (e.g., CLIP/VIT embeddings, part-encoder embeddings) representing the appearance of each part and/or each detected feature, optionally aggregated into an "identity embedding" for the vehicle; (vi) a pose/structure representation such as a set of 2D keypoints (e.g., wheel centers, headlight corners), a sparse landmark graph, a dense correspondence map, a depth map, a normal map, and/or a coarse 3D proxy (e.g., a fitted CAD template or neural radiance field parameters) used to enforce geometry in the standardized view; (vii) text prompts and negative prompts that specify required attributes and prohibited deviations (e.g., "retain scratch on left front bumper; retain 5-spoke rim design; do not add sunroof; do not change badge"), optionally generated automatically from detected attributes; (viii) explicit attribute constraints expressed as classifiers or logits (e.g., "rimstyle=class17," "paintcolor=darkblue," "sunroof-present") that are provided as conditioning signals and/or used to re-rank candidate generations; (ix) a retrieval-based package comprising pointers/IDs into a part-indexed reference library (e.g., hashes to stored part crops and embeddings), enabling the generation AI-agent to fetch high-fidelity exemplars of the same vehicle part from the best source view; and/or (x) a set of guidance weights and schedules (e.g., per-part CFG weights, per-region denoise strengths, per-step mask blending factors) that dictate how strongly the generative process must adhere to each constraint, including stronger adherence for identity-critical regions and weaker adherence for background or non-identifying regions.

At 206, a combination of the unconstrained input image and the set of generation reference data (generated by the inspection AI-agent) is fed into a generation AI-agent for generating at least one candidate standardized image.

The generation AI-agent is designed and/or trained to generate a candidate standardized image(s) that renders the specific physical vehicle depicted in the unconstrained input image according to at least one standardized parameter, while preserving visual features as described by the set of generation reference data.

The generation AI-agent may be designed to execute generative image synthesis and/or editing tasks.

The standardized parameter(s) may correspond to the parameter(s) associated with the unconstrained input image. The generation AI-agent is designed and/or trained to synthesize the standardized image with the standardized parameter(s) from the unconstrained input image with arbitrary parameters. For example, images of cars captured from different poses (e.g., angles relative to the vehicle and/or distances from the vehicle) are standardized to a common predefined pose. In another example, images of cars with different lighting are standardized to a common predefined lighting pattern.

In some embodiments, the system is configured to learn (and subsequently apply) a "standardization profile" that defines the target appearance of the standardized image(s), including, for example, a predefined camera pose (e.g., front three-quarter at a specified azimuth/elevation and distance), focal length and field-of-view, cropping/framing rules, target resolution and compression quality, background type (e.g., uniform studio backdrop), and an illumination/exposure style (e.g., key/fill/rim light ratios, shadow softness, white balance, and tone curve). The standardization profile may be learned by providing the system with one or more exemplar standardized photographs (or renderings) of one or more vehicles captured under the desired standard, optionally accompanied by explicit labels and/or metadata (e.g., pose parameters, lens parameters, and lighting descriptors). From such exemplars, the system may train and/or fit a parameterized representation of the standard (e.g., a canonical pose distribution, a canonical color/tonemapping transform, and a canonical background/scene model), and store the learned parameters as standardization reference data. During inference for a new unconstrained input image, the learned standardization profile is used as conditioning for the generation AI-agent (and/or as constraints enforced by the inspection AI-agent) so that the generation AI-agent synthesizes the vehicle under the learned canonical pose and capture characteristics while preserving the vehicle's identity-specific attributes (e.g., damage, trim, rim design) extracted from the unconstrained input image; stated differently, the system adapts the depiction of the input vehicle to conform to the learned standard (pose/lighting/quality/framing) rather than attempting to preserve the unconstrained capture conditions, and optionally iteratively refines the output until both (i) compliance with the learned standardization profile and (ii) visual identity fidelity thresholds are satisfied.

Optionally, the generation AI-agent applies multi-modal conditioning, including at least two of: text, image, and mask, for generating the candidate standardized image(s) complying with the set of generation reference data.

The generation AI-agent may be implemented as and/or may invoke, for example, a latent diffusion model and/or generative adversarial network (GAN) for generation of the candidate standardized image(s) according to the set of generation reference data.

The generation AI-agent (e.g., a diffusion model with ControlNet-style adapters and/or image-prompt encoders) may condition the generative process on the visual cues (e.g., concatenated multi-channel conditioning tensors and/or image embeddings computed from the reference crops) and/or condition on the verbal description (e.g., as a positive prompt and associated negative prompt(s)), optionally with per-part guidance weights that enforce stronger adherence in identity-critical regions (e.g., wheels, damage, badges) than in non-critical regions (e.g., background). For example, a rim crop from a best-quality frame may be provided as an image prompt and/or embedding for a "wheel" region, while a separate damage crop and damage mask are provided to constrain inpainting of a door panel, and the verbal description explicitly requires retention of the five-spoke rim pattern and the door scratch and prohibits hallucinated additions (e.g., "do not add sunroof"). The visual cues and/or verbal description may reduce drift and/or hallucination in the candidate standardized image generated by the generation AI-agent.

At 208, the candidate standardized image(s) generated by the generation AI-agent is fed into the inspection AI-agent.

The candidate standardized image may be fed with a prompt indicating that the candidate standardized image was generated based on the set of generation reference data which was previously generated by the inspection AI-agent. Alternatively, the inspection AI-agent is designed to understand that a feeding of a current candidate standardized image is generated based on the previously generated set of generation reference data.

The inspection AI-agent may be designed with a memory to maintain data from previous iterations, in order to learn how to adapt the currently generated set of generation reference data to instruct the generation AI-agent generate candidate standardized image(s) that correct errors in the previous version of the candidate standardized image(s).

At 210, the inspection AI-agent evaluates the candidate standardized image(s) in view of the unconstrained input image for detecting visual inconsistencies.

Visual inconsistencies may be detected with respect to a specific vehicle part(s) and/or with respect to a specific location(s) within the specific vehicle part.

Visual inconsistencies that may be detected by the inspection AI-agent include detecting at least one mismatched vehicle part, and/or detecting at least one mismatched visual feature between specific corresponding vehicle parts.

The visual inconsistencies may refer to a mismatch between the unconstrained input image and the candidate standardized images. The mismatch may include, for example:

- A visual feature(s) present in the unconstrained input image(s) that is absent from the candidate standardized image(s).

A visual feature present in the candidate standardized image(s) that is absent from the unconstrained input image(s).

A visual feature(s) present in the unconstrained input image(s) that is different from the corresponding feature in the candidate standardized image(s).

Examples of visual inconsistencies between the specific vehicle in the unconstrained input image(s) and the candidate standardized image(s) which may be detected by the inspection AI-agent include: a scratch pattern, dent geometry, sticker placement, aftermarket modification, and damage marking.

Optionally, a corresponding part-wise similarity score is computed for each vehicle part. The corresponding part-wise similarity score may be computed between a respective vehicle part of the candidate standardized image(s) and the corresponding vehicle part of the unconstrained input image (s). The part-wise similarity score may be computed based on the records of the part-indexed reference library generated for the input image. The part-wise similarity score may be computed by taking into account visual similarity between detected features of the corresponding vehicle part. The value of the part-wise similarity score may indicate visual inconsistency. For example, visual inconsistency between the corresponding vehicle parts is detected when the part-wise similarity score is below (or above) a threshold. The threshold may be set to indicate visually insignificant differences (e.g., there may be small differences which are not considered to be visually significant).

Alternatively or additionally, a corresponding feature-wise similarity score is computed for each detected feature. The corresponding feature-wise similarity score may be computed between a respective feature of the candidate standardized image(s) and the corresponding feature of the unconstrained input image(s). The feature-wise similarity score may be computed based on the records of the part-indexed reference library generated for the input image. The value of the feature-wise similarity score may indicate visual inconsistency. For example, visual inconsistency between the corresponding features is detected when the feature-wise similarity score is below (or above) a threshold (which may be the same or different than the threshold used for the part-wise similarity score). The threshold may be set to indicate visually insignificant differences (e.g., there may be small differences which are not considered to be visually significant).

The part-wise similarity score and/or the feature-wise similarity score may be computed using one or more approaches, for example:

A correlation between the corresponding parts and/or features. The correlation may be computed between encodings and/or vectors of the corresponding parts and/or features, which may be computed for example, by feeding the parts and/or image portion including the features into an encoding neural network. The correlation value indicates the amount of similarity. For example, a higher correlation value may indicate a higher similarity.

A Euclidean distance (or other distance such as cosine distance) between the corresponding parts and/or features. The Euclidean distance (or other distance) indicates the amount of similarity. For example, a lower distance may indicate a higher similarity. The distance may be computed between encodings and/or vectors of the corresponding parts and/or features, which may be computed for example, by feeding the parts and/or image portion including the features into an encoding neural network.

A neural network trained to compute the similarity score. The neural network may include two inputs designed to receive the unconstrained image and the candidate standardized image, or portions thereof depicting the parts and/or features, and an output that generates the score. The neural network may be trained on a training dataset of pairs of images and ground truth of scores.

In some embodiments, the inspection AI-agent (and optionally components of the generation AI-agent) are trained using supervised and/or self-supervised learning on a corpus of vehicle imagery in which corresponding vehicle parts are observed across materially different capture conditions, thereby teaching the model to score identity-preserving similarity and to localize meaningful differences notwithstanding changes in pose, lighting, focus, exposure, and background. By way of example, training data may include (i) multi-view photographs of the same physical vehicle captured at different azimuth/elevation angles and illumination settings, (ii) "hard negative" pairs comprising visually similar vehicles of the same make/model/year but different trim elements (e.g., different rim designs, different grille patterns), and/or (iii) synthetically augmented examples generated by applying controlled perturbations (e.g., relighting, blur/noise injection, viewpoint warps) so that the ground-truth correspondence is known. The inspection AI-agent may be trained to produce part embeddings and/or feature embeddings using metric-learning losses (e.g., contrastive, triplet, or N-pair losses) that pull embeddings of the same part from the same vehicle together across conditions while pushing embeddings of non-matching parts (or the same part from a different vehicle) apart; in addition, the inspection AI-agent may be trained with multi-task objectives that jointly learn semantic part segmentation, fine-grained attribute classification (e.g., rim style class, badge presence), and damage detection/segmentation (e.g., scratch masks or dent regions), thereby improving sensitivity to localized identifiers. For scratches and other surface defects, the training labels may include pixel-level masks, oriented bounding boxes, and/or parametric descriptors (e.g., length, curvature, orientation), and the loss may weight thin, low-contrast structures so that the model learns to detect scratches under specular highlights and varying paint colors. For rim patterns, training labels may include spoke count/type, lug pattern, and center-cap branding, and the model may be trained to compare canonicalized rim crops (e.g., via polar unwrapping or keypoint-normalization) so that pattern similarity is learned to be invariant to wheel rotation, foreshortening, and partial occlusion. In some embodiments, a learned similarity head is trained on labeled pairs ("match"/"non-match"/"uncertain") of corresponding parts, optionally conditioned on the estimated part pose, to output a calibrated similarity score used by the inspection AI-agent to trigger inconsistency detection and to prioritize corrective updates to the generation reference data.

In some embodiments, the inspection AI-agent determines visual inconsistencies using multiple complementary comparison techniques operating at global, part-level, and/or feature-level granularity, optionally producing an "inconsistency heatmap" that localizes pixels and/or regions that contribute most to a mismatch. For example, the inspection AI-agent may first perform geometric alignment between the unconstrained input image(s) and the candidate standardized image by estimating a homography and/or a dense correspondence field (e.g., optical flow or learned keypoint-tokeypoint correspondences) so that like-for-like portions of the vehicle are compared notwithstanding viewpoint differences. Once aligned, inconsistencies may be detected using photometric and structural measures (e.g., SSIM/MS-SSIM, LPIPS perceptual distance, gradient-domain differences, edge-map comparison using Canny/Sobel, or histogram/patch-based comparisons in HSV/Lab color space) computed globally and/or within each segmented vehicle part. Alternatively or additionally, the inspection AI-agent may compare semantic and instance segmentation outputs between the input and candidate images, such as verifying that a sunroof region is present and correctly shaped, that the number and placement of lights, mirrors, and badges match, and that part boundaries (e.g., door seams, bumper lines, hood gaps) have consistent topology; by way of example, the inspection AI-agent may detect an inconsistency where a door handle is shifted relative to the door seam, or where a badge is hallucinated or omitted. Further, the inspection AI-agent may apply specialized detectors for fine-grained identifiers, including (i) damage detectors that characterize scratch/dent location, orientation, length/area, specular highlight behavior, and shadowing; (ii) wheel/rim classifiers that compare spoke count, spoke curvature, center-cap logo presence, and lug-nut pattern; (iii) text/logo/OCR modules that detect mismatched alphanumeric strings on license plates, trim emblems, or decals; and (iv) texture/material classifiers that detect drift in paint finish (e.g., metallic flake appearance), plastic trim gloss, window tint, or carbon-fiber patterns. In some embodiments, the inspection AI-agent computes part-wise and/or feature-wise similarity using embeddings from one or more encoders (e.g., a contrastively-trained vision transformer), and flags inconsistencies where an embedding distance exceeds a threshold, optionally weighted by a saliency score that emphasizes high-importance regions (e.g., badges, damage, wheel hubs) over low-importance regions (e.g., background). In multi-view scenarios, inconsistencies may further be detected by enforcing cross-view consistency constraints, such as requiring that a feature detected on a particular part (e.g., a scratch on the left front fender) persists at a geometrically consistent location across standardized views via reprojection using an estimated depth map and/or a coarse 3D proxy, and flagging drift where a feature "moves," changes shape, or disappears across views. In still further embodiments, physics-inspired checks are used to detect implausible generation artifacts indicative of inconsistency, such as shadow direction changes relative to a standardized illumination model, inconsistent reflection fields on glossy paint across adjacent panels, or abnormal symmetry violations (e.g., mismatched headlight geometry left-to-right when the input indicates symmetric factory lights), any of which may be used individually or in combination to trigger adaptation of the generation reference data and/or creation of a localized repair mask.

In some embodiments, the inspection AI-agent performs the comparison (i.e., the evaluation) between the candidate standardized image(s) in view of the unconstrained input image for detecting visual inconsistencies using a vehicle part-specific "tooling" suite including multiple different tests selected and/or parameterized based on the vehicle part being evaluated. Visual inconsistency may be determined according to a weighted aggregate score computed from the multiple tests. For example, for a wheel/rim region the tooling suite may include one or more of:

A frequency-domain comparison (e.g., fast Fourier transform (FFT) magnitude and/or log-spectrum correlation computed on a canonicalized rim crop such as a polar-unwrapped representation) to capture periodic spoke patterns and fine texture A keypoint/contour test (e.g., edge-map alignment and Hough-circle/spoke-line detection) to validate spoke count and geometry.

An embedding-based semantic similarity test using a vision-language model (VLM) and/or vision transformer embedding to distinguish "hard negatives" such as visually similar rims.

In the example, for damage regions (e.g., scratches/dents), the tooling suite may include one or more of:

Gradient- and high-pass-filter response comparisons to emphasize thin low-contrast scratches.

Structural similarity tests (e.g., SSIM computed within a damage mask).

A VLM-based textual grounding test that verifies that a detected attribute described from the input (e.g., "scratch near passenger door handle") is present in the candidate image at a consistent location.

The inspection AI-agent may compute, for each test, a normalized sub-score (e.g., 0-1). The inspection AI-agent may combine the sub-scores using configurable weights that depend on, for example, the part and/or feature class (e.g., higher weight on FFT periodicity for rims, higher weight on gradient-domain response for scratches, higher weight on OCR accuracy for badges/decals). The sub-score may be further weighted by confidence of the underlying segmentation/detection and by saliency of the region. The resulting weighted similarity score (or weighted difference score) may be compared to one or more thresholds to flag an inconsistency and to rank which parts should be corrected first; for example, a candidate image may be flagged as inconsistent when rim FFT similarity drops below a rim-specific threshold even if a global perceptual score remains high. The scoring approach may improve sensitivity to small deviations, which may be significant.

In some embodiments, the part-specific "tooling" suite may be trained and/or calibrated using, for example, supervised, weakly-supervised, and/or self-supervised learning so that each test (and the corresponding weights used in the aggregate score) becomes specialized to the failure modes of a particular vehicle part. For example, for each part category (e.g., rim, headlight, grille, badge, door panel), a training corpus may be assembled that includes paired crops of that part extracted from (i) a real captured input image (or best-quality frame from a capture sequence) and (ii) a generated candidate standardized image purportedly representing the same physical vehicle. Each pair may be labeled as, for example, "match," "non-match," and/or "uncertain," optionally with sublabels indicating the type of mismatch (e.g., "spoke count differs," "scratch missing," "badge text differs," "sunroof hallucinated"). Such labels may be obtained, for example, via human annotation, via synthetic perturbations with known ground truth (e.g., programmatically changing spoke count, removing a scratch mask, swapping a badge crop), and/or via high-confidence heuristics (e.g., VIN/trim constraints for certain attributes).

In some embodiments, at least one of the tests includes a learned discriminator model trained on these paired part crops to output a similarity/difference score. The discriminator may be implemented, for example, as a Siamese network and/or a two-tower encoder (e.g., ResNet or vision transformer backbone) that generates embeddings for each crop and feeds the concatenated embeddings, absolute difference, and/or cosine similarity into a classification head that outputs a probability of "same" versus "different."

Alternatively or additionally, the discriminator may be implemented as a cross-attention model that jointly attends over both crops to localize mismatching structures (e.g., missing dent highlight/shadow cues, altered seam lines, or an incorrect logo). In some embodiments, the discriminator is trained with a binary cross-entropy loss (match/non-match), optionally combined with metric learning losses (e.g., contrastive or triplet loss) to enforce that embeddings of matching parts are closer than embeddings of non-matching parts by a margin. The discriminator may also output an auxiliary localization map (e.g., a per-pixel or patch-level mismatch heatmap) trained using available masks/bounding boxes for known defect regions, which can be used downstream to drive repair mask generation (e.g., at 212).

In some embodiments, the training process is designed to normalize away nuisance factors so that the discriminator learns identity-preserving similarity rather than superficial photometric similarity. For example, part crops may be augmented with randomized exposure/white balance shifts, blur, JPEG artifacts, specular relighting, and mild viewpoint warps so that the discriminator remains robust to capture-condition differences between the unconstrained input and the standardized render. For rims, the training pipeline may include canonicalization operations (e.g., detecting the wheel circle, rectifying perspective, and polar unwrapping) so that the discriminator can learn spoke periodicity and lug pattern similarity invariant to wheel rotation and foreshortening; for badges/decals, the pipeline may include OCR-augmented supervision where the discriminator is penalized if alphanumeric strings differ even when overall appearance is close.

In some embodiments, the aggregate weighted score used to decide similarity/difference may be trained. For example, outputs from multiple tests (e.g., FFT correlation, SSIM, LPIPS distance, VLM embedding distance, OCR match score, and the learned discriminator probability) may be fed into a lightweight fusion model (e.g., logistic regression, gradient-boosted trees, or a small neural network) trained to predict the ground-truth match/non-match label for the part. The fusion model learns part-specific weights (and optionally nonlinear interactions), such as placing higher weight on frequency-domain features for rims, higher weight on gradient-domain responses for scratches, and higher weight on OCR/VLM outputs for badges and trim emblems. In this manner, the inspection AI-agent may generate a calibrated, part-aware inconsistency score that triggers corrective adaptation when a generated part is semantically or structurally wrong even if global perceptual similarity is high, thereby improving detection of subtle but commercially material deviations (e.g., a missing scratch, an incorrect rim style, or an added/removed sunroof).

At 212, the inspection AI-agent may adapt the previously generated set of generation reference data in response to identifying one or more visual inconsistencies between the candidate standardized image(s) and the input image(s).

The adaptation may be performed for instructing correcting the detected visual inconsistencies in the candidate standardized image(s). For example, for correcting erroneous vehicle parts and/or erroneous visible features.

Alternatively or additionally, the adaptation may be performed by generating a new version of the set of generation reference data, designed to instruct generation of a new version of the candidate standardized image(s) which reduce or eliminate the detected visual inconsistencies.

Alternatively or additionally, the adaptation may be performed by generating instructions (optionally within the set of generation reference data) for localized repair of a target vehicle part including a repair mask. The repair mask may be generated for including the whole vehicle part or portion of the vehicle part of the candidate standardized image, which has been identified as being visually inconsistent with the corresponding vehicle part of the input image. For example, the repair mask is generated for regions (e.g., vehicle parts) where the part-wise and/or feature-wise similarity score indicates visual inconsistency. Instructions for repair within the repair mask may be generated.

Alternatively or additionally, the adaptation may be performed by generating instructions for re-generation of the whole candidate standardized image. The instructions may indicate how to re-generate the standardized image of the vehicle without the visual inconsistency. The instructions may be implemented as, for example, a natural language prompt, machine readable instructions, an encoding, and the like. For example, the natural language prompt may indicate "The synthesized image of the vehicle did not include the scratches on the left side of the front bumper, as they appear in the input image. Re-generate the image to include the scratches." Another example of the natural language prompt includes "The synthesized image of the vehicle includes wheel hubs which have a different design than the wheel hubs that appear in the input image. Re-generate the image of the vehicle using the same wheel hub design."

At 214, the adapted set of generation reference data is fed into the generation AI-agent. The generation AI-agent generates an adaptation of the candidate standardized image(s).

Optionally, the generation AI-agent generates the adapted candidate standardized image(s) as a new synthesized image according to the adapted set of generation reference data.

Alternatively, the generation AI-agent generates the adapted candidate standardized image(s) by performing an image editing process on the candidate standardized image (s) generated in the preceding iteration. The image editing process may be constrained to the generated repair mask. The image editing process may be performed within the generated repair mask according to the generated instructions for localized repair of the target vehicle part and/or feature. The image editing process constrained to the repair mask may constrain pixels outside the repair mask to remain unchanged relative to the candidate standardized image being edited, for example, by implementing one or more of: a pixel-domain reconstruction loss outside the repair mask, a latent-space preservation loss outside the repair mask, and a guidance weight configured to suppress modifications outside the repair mask.

At 216, one or more features described with reference to 208-214 may be iterated.

Features described with reference to 204 and 206 represent initial (e.g., baseline) processing, which is iteratively refined by the iterations described with reference to 208-214.

The iterations are performed by feeding the adaptation of the candidate standardized image(s), generated in the current adaptation, into the inspection AI-agent in a subsequent adaptation.

The iterations may be terminated when the detected inconsistencies meet a requirement denoting visually insignificant differences. The requirement may indicate visually insignificant differences that preserve visual identity of the specific physical vehicle included in the unconstrained input image. For example, the iterations are terminated in response to determining that each part-wise similarity score of each vehicle part is above (or below) the threshold indicating visually insignificant differences. In another example, the iterations are terminated in response to determining that each feature-wise similarity score of each visual feature is above (or below) the threshold indicating visually insignificant differences.

At 218, the adaptation of the candidate standardized image(s) obtained in the final iterations (that was terminated) is provided as a target standardized image(s).

The target standardized image(s) may be provided, for example, presented on a display, stored on a data storage device, printed, forwarded to another device, fed into another executing process, and the like.

At 220, one or more features described with reference to 202-218 may be iterated.

The iterations may be implemented as a closed-loop iterative process where the inspection AI-agent generates control data, the generation AI-agent synthesizes imagery, and the inspection AI-agent subsequently validates the generated images against the original input images, triggering refinement cycles until fidelity thresholds are met.

The iterations may be performed, for example, for different unconstrained inputs images of different vehicles, and/or for different unconstrained inputs images of the same vehicle that vary in one or more parameters (e.g., camera pose, lighting, resolution, focus, and the like). Multiple target standardized images are generated by the iterations for multiple unconstrained input images of different vehicles and/or images of the same vehicle with different parameters.

The multiple target standardized images are generated for depicting the different vehicles and/or the same vehicle by at least one standardized parameter. Each of the multiple target standardized images have the standardized parameter(s) in common. Examples of the standardized parameters include: a predefined pose, predefined illumination, predefined resolution, predefined image quality, and predefined background.

The multiple target standardized images may include a composite set of photorealistic images rendering the specific vehicle at one or more common standardized parameters, for example, from predefined viewing angles (e.g., front ¾, side profile, rear) under standardized illumination and/or spatial environments.

The multiple target standardized images may be generated for preserving fine-grained visual attributes of the original vehicle (e.g., specific shape, texture, color, trim level, and unique identifiers (e.g., scratches, aftermarket modifications)), ensuring the generated images are a faithful and consistent representation of the physical vehicle.

Referring now back to FIG. 3, the dataflow described with reference to FIG. 3 may be implemented by components of the system described with reference to FIG. 1, and/or may be implemented by, and/or may serve as alternatives to, one or more features of the method described with reference to FIG. 2.

One or more unconstrained vehicle images 304 and optionally vehicle metadata 306 are fed into an inspection AI-agent 308. The inspection AI-agent 308 may invoke one or more VLMs and/or LLMs 310, and/or DNN models 312 for generating generation reference data 314. Generation reference data 314 is fed into a generation AI-agent 316, which may invoke one or more diffusion models 318 for generating candidate standardized images 320. Generation AI-agent utilizes the generation reference data provided by the inspection AI-agent to synthesize photorealistic images. It may apply multi-modal conditioning (e.g., text, image, mask) in an attempt to generate standardized images that align with one or more standardized parameters (e.g., requirements) while strictly adhering to the specific attributes of the source vehicle (e.g., color, trim, custom stickers, damages). The generation AI-agent may be designed for in-painting, out-painting, and/or full image synthesis to achieve photorealism indistinguishable from optical photography. The candidate standardized images 320 are fed into inspection AI-agent 308 in a feedback loop, for generating an adaptation (or a new version) of generation reference data 314. Post-generation, inspection AI-agent performs a forensic inspection of the synthetic output against the original input images. Upon detecting inconsistencies (e.g., mismatched rim style, missing sunroof), it formulates a corrective plan, updates the generation reference data, and triggers a refinement iteration. The iterations proceed until there are visually insignificant differences between candidate standardized images 320 and unconstrained vehicle images 304. The most recently generated candidate standardized images 320 are provided as a target set of standardized images 322.

Various embodiments and aspects of the present invention as delineated hereinabove and as claimed in the claims section below find support in the following example.

EXAMPLES

Reference is now made to the following example, which together with the above descriptions illustrate some embodiments of the invention in a not necessarily limiting fashion.

The example is a use case for a remote vehicle appraisal and marketplace.

In an exemplary use case, a used-vehicle marketplace operator (e.g., an online dealer, auction platform, fleet remarketing entity, or insurer salvage marketplace) receives trade-in and/or listing submissions from multiple vehicle owners using respective mobile devices. Each owner captures a small set of unconstrained photographs of a respective physical vehicle, for example 4-12 images taken at arbitrary poses and distances, under uncontrolled lighting (e.g., direct sunlight, shade, garage lighting), with background clutter (e.g., other cars, pedestrians, signage), and with variable image quality (e.g., motion blur, compression artifacts, partial occlusion).

The marketplace operator desires to publish a standardized set of photorealistic "merchandising" images for each vehicle listing, such that (i) each listing includes a consistent set of views (e.g., front three-quarter, side profile, rear three-quarter, interior dash), (ii) the images share standardized capture characteristics (e.g., same background, same lighting profile, same framing and resolution), and (iii) the images faithfully preserve the visual identity of the specific physical vehicle, including fine-grained identifiers such as dents, scratches, paint chips, stickers, trim options, rim design, sunroof presence, window tint, and badges.

In operation, the marketplace operator transmits the unconstrained photographs (and optionally vehicle metadata such as VIN decode results, make/model/year/trim, and color) to a computing environment implementing the system described herein. An inspection AI-agent ingests the unconstrained photographs and generates a set of generation reference data including, for example: (a) semantic segmentation of vehicle parts; (b) part-level attributes (e.g., rim style classification, badge presence); (c) damage localization (e.g., scratch masks on a left-front bumper and a dent region on a rear door); and (d) part-indexed reference crops and/or embeddings representing identity-critical regions (e.g., wheels, grille, and localized damage).

A generation AI-agent then synthesizes one or more candidate standardized images of the same physical vehicle in accordance with a predetermined standardization profile (e.g., studio-like neutral background, fixed camera pose, fixed illumination, and uniform cropping). The candidate standardized images are returned to the inspection AI-agent, which compares the candidate standardized images to the original unconstrained photographs and determines whether any visual inconsistencies exist. By way of example, the inspection AI-agent may detect that a first candidate standardized image incorrectly depicts a different wheel hub pattern (e.g., 6-spoke instead of the vehicle's actual 5-spoke rim), omits a thin scratch on the passenger-side door, and hallucinates an absent feature (e.g., adds a sunroof not present in the input photographs).

In response, the inspection AI-agent adapts the generation reference data to correct the inconsistencies, for example by: (i) increasing conditioning weight for wheel/rim identity regions; (ii) generating a localized repair mask over the passenger door area; and/or (iii) providing updated textual constraints and negative prompts (e.g., "retain 5-spoke rim design; retain scratch on passenger door; do not add sunroof"). The adapted generation reference data is provided to the generation AI-agent, which regenerates (or edits) the candidate standardized image(s). This closed-loop process iterates until the inspection AI-agent determines that remaining differences between the standardized image(s) and the unconstrained input photographs are visually insignificant and that the visual identity of the specific physical vehicle is preserved.

Upon termination, the computing environment outputs a final standardized image set for the listing, which may be automatically published to the marketplace webpage and/or delivered via an API to downstream systems (e.g., appraisal tools, pricing engines, condition reports, advertising creatives). Advantageously, the standardized images provide uniform presentation across a large inventory while reducing misleading omissions and/or hallucinations (e.g., missing damage, incorrect rims, incorrect trim features), thereby improving listing quality, consumer trust, and operational efficiency.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant AI-agents will be developed and the scope of the term AI-agent is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of generating at least one standardized vehicle image, comprising:
feeding at least one unconstrained input image including a specific physical vehicle into an inspection AI-agent;
generating, by the inspection AI-agent, a set of generation reference data,
wherein the set of generation reference data includes a plurality of vehicle parts and, for each vehicle part, at least one visual feature;
feeding the at least one unconstrained input image and the set of generation reference data into a generation AI-agent for generating at least one candidate standardized image,
wherein the at least one candidate standardized image renders the specific physical vehicle according to at least one standardized parameter;
performing, in a plurality of iterations:
feeding the at least one candidate standardized image into the inspection AI-agent;
evaluating, by the inspection AI-agent, the at least one candidate standardized image in view of the at least one unconstrained input image for detecting visual inconsistencies;
adapting the set of generation reference data for correcting the detected visual inconsistencies;
feeding the adapted set of generation reference data into the generation AI-agent to obtain an adaptation of the at least one candidate standardized image,
wherein the adaptation of the at least one candidate standardized image is fed into the inspection AI-agent in a subsequent iteration,
wherein the plurality of iterations are terminated when the detected inconsistencies meet a requirement denoting visually insignificant differences that preserve visual identity of the specific physical vehicle included in the at least one unconstrained input image; and
providing the adaptation of the at least one candidate standardized image of the terminated iteration as at least one target standardized image.

2. The computer implemented method of claim 1, further comprising computing a corresponding part-wise similarity score for each vehicle part of the plurality of vehicle parts, the corresponding part-wise similarity score computed between a respective vehicle part of the at least one candidate standardized image and the corresponding vehicle part of the at least one unconstrained input image, wherein the plurality of iterations are terminated in response to determining that each part-wise similarity score is above a threshold indicating visually insignificant differences.

3. The computer implemented method of claim 1, wherein the at least one unconstrained input image varies in at least one of: pose, lighting, exposure, background, camera, optics, framing, resolution, and image quality.

4. The computer implemented method of claim 1, wherein a plurality of candidate standardized images are generated for a plurality of unconstrained input images for a plurality of different vehicles, wherein each of the plurality of candidate standardized images depicting the plurality of different vehicles is generated to depict at least one standardized parameter selected from: a predefined pose, predefined illumination, predefined resolution, predefined image quality, and predefined background.

5. The computer implemented method of claim 1, wherein each vehicle part is represented in the set of generation reference data by at least one of: a text prompt description, an image embedding, a Canny edge map, a depth map, a semantic segmentation map, a reference crop, and a mask.

6. The computer implemented method of claim 1, wherein the at least one feature for each vehicle part is selected from: detected damage, trim, stickers, color, corresponding physical size, specific design style.

7. The computer implemented method of claim 1, wherein detecting visual inconsistencies comprises at least one of: detecting at least one mismatched vehicle part, and detecting at least one mismatched visual feature between specific corresponding vehicle parts.

8. The computer implemented method of claim 1, wherein the at least one unconstrained input image comprises a photograph of the specific physical vehicle captured by a camera, and the at least one candidate standardized image comprises a synthesized photorealistic image of the specific physical vehicle.

9. The computer implemented method of claim 1, wherein the generation AI-agent applies multi-modal conditioning, including at least two of: text, image, and mask, for generating the at least one candidate standardized image complying with the set of generation reference data.

10. The computer implemented method of claim 1, wherein the at least one unconstrained input image is fed into the inspection AI-agent in combination with vehicle metadata.

11. The computer implemented method of claim 1, wherein the generation AI-agent is implemented as a latent diffusion model for generation of the at least one candidate standardized image according to the set of generation reference data.

12. The computer implemented method of claim 1, wherein the inspection AI-agent is implemented as at least one of: Vision-Language Models (VLMs), Large Language Models (LLMs), and Deep Neural Networks (DNNs).

13. The computer implemented method of claim 1, wherein the inspection AI-agent is configured for generating the set of generation reference data by at least one of: semantic segmentation of the plurality of vehicle parts, classification of the plurality of vehicle parts, and detection of the at least one feature for specific vehicle parts.

14. The computer implemented method of claim 1, wherein the plurality of vehicle parts are selected from: wheels, rims, grille, lights, mirrors, windows, roof, and badges.

15. The computer implemented method of claim 1, wherein visual inconsistencies between the specific vehicle in the at least one unconstrained input image and the at least one candidate standardized image detected by the inspection AI-agent are selected from: a scratch pattern, dent geometry, sticker placement, aftermarket modification, and damage marking, and associated with a specific vehicle part and/or associated with a location within the specific vehicle part.

16. The computer implemented method of claim 1, wherein the adapted set of generation reference data comprises instructions for localized repair of a target vehicle part including a repair mask,
wherein the generation AI-agent generates the at least one adapted candidate standardized image by performing an image editing process constrained to the repair mask according to the instructions for localized repair of the target vehicle part.

17. The computer-implemented method of claim 16, wherein the image editing process constrained to the repair mask further comprises constraining pixels outside the repair mask to remain unchanged relative to the candidate standardized image being edited by applying at least one of: a pixel-domain reconstruction loss outside the repair mask, a latent-space preservation loss outside the repair mask, and a guidance weight configured to suppress modifications outside the repair mask.

18. The computer implemented method of claim 1, further comprising:

creating a part-indexed reference library from the at least one unconstrained input image of the specific physical vehicle, the part-indexed reference library comprising, for each of the plurality of vehicle parts, the at least one visual feature, at least one reference crop, and at least one embedding of the vehicle part;

computing part-wise similarity scores between generated part regions in the at least one candidate standardized image and corresponding entries in the part-indexed reference library;

identifying at least one erroneous vehicle part having a part-wise similarity score below a threshold indicating visual inconsistency; and adapting the set of generation reference data for correcting the at least one erroneous vehicle part.

19. A system for generating at least one standardized vehicle image, comprising:

at least one processor executing a code for:

feeding at least one unconstrained input image including a specific physical vehicle into an inspection AI-agent;

generating, by the inspection AI-agent, a set of generation reference data, wherein the set of generation reference data includes a plurality of vehicle parts and, for each vehicle part, at least one visual feature;

feeding the at least one unconstrained input image and the set of generation reference data into a generation AI-agent for generating at least one candidate standardized image, wherein the at least one candidate standardized image renders the specific physical vehicle according to at least one standardized parameter;

performing, in a plurality of iterations:

feeding the at least one candidate standardized image into the inspection AI-agent;

evaluating, by the inspection AI-agent, the at least one candidate standardized image in view of the at least one unconstrained input image for detecting visual inconsistencies;

adapting the set of generation reference data for correcting the detected visual inconsistencies;

feeding the adapted set of generation reference data into the generation AI-agent to obtain an adaptation of the at least one candidate standardized image, wherein the adaptation of the at least one candidate standardized image is fed into the inspection AI-agent in a subsequent iteration, wherein the plurality of iterations are terminated when the detected inconsistencies meet a requirement denoting visually insignificant differences that preserve visual identity of the specific physical vehicle included in the at least one unconstrained input image; and providing the adaptation of the at least one candidate standardized image of the terminated iteration as at least one target standardized image.

20. A non-transitory medium storing program instructions for generating at least one standardized vehicle image, which when executed by at least one processor of a first proxy device, cause the at least one processor to:

feed at least one unconstrained input image and the set of generation reference data into a generation AI-agent for generating at least one candidate standardized image, wherein the at least one candidate standardized image renders the specific physical vehicle according to at least one standardized parameter;

performing, in a plurality of iterations:

feeding the at least one candidate standardized image into an inspection AI-agent;

evaluate, by the inspection AI-agent, the at least one candidate standardized image in view of the at least one unconstrained input image for detecting visual inconsistencies;

adapt the set of generation reference data for correcting the detected visual inconsistencies;

feed the adapted set of generation reference data into the generation AI-agent to obtain an adaptation of the at least one candidate standardized image, wherein the adaptation of the at least one candidate standardized image is fed into the inspection AI-agent in a subsequent iteration, wherein the plurality of iterations are terminated when the detected inconsistencies meet a requirement denoting visually insignificant differences that preserve visual identity of the specific physical vehicle included in the at least one unconstrained input image; and provide the adaptation of the at least one candidate standardized image of the terminated iteration as at least one target standardized image.

* * * * *